W. I. Alvord.

Centering Tool.

N° 96,653. Patented Nov. 9, 1869.

Witnesses.
P. C. Moulton
R. Fitzgerald.

Inventor.
Williston I. Alvord

United States Patent Office.

WILLISTON I. ALVORD, OF BRIDGEPORT, CONNECTICUT.

Letters Patent No. 96,653, dated November 9, 1869.

IMPROVED CENTRING-TOOL.

The Schedule referred to in these Letters Patent and making part of the same.

*To all whom it may concern:*

Be it known that I, WILLISTON I. ALVORD, of the city of Bridgeport, in the county of Fairfield, and State of Connecticut, have invented a new and useful Improvement in Centring-Tools or Instruments; and I do hereby declare that the following is a full, clear, and exact description of the construction, character, and operation of the same, reference being had to the accompanying drawings, which make part of this specification, in which—

My improvement consists in constructing a tool or instrument which will point out the exact centre of any piece of cylindrical metal, &c., for turning, drilling, &c., or if it is, in its cross-section, an equilateral triangle, a hexagon, encagon, &c.

Figure 2:
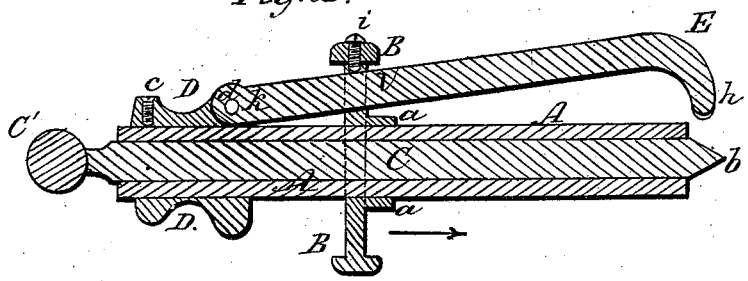
Figure 2 is a section of the same, cut longitudinally through one of the jaws, the circle or plate, cylinder, centre, two of the screws, and one of the springs.

I make the hollow cylinder A of cast-metal, or any other suitable material, with the most careful and exact drilling and turning, as indicated in section at A A, fig. 2, so that the hub or nave $a$, of the circle B, may slide freely, yet steadily, upon the outward surface, and so that the solid centre C may pass through the calibre of the cylinder with freedom, and yet comparatively air-tight, so as to render its effect in centring practically true.

Figure 1:
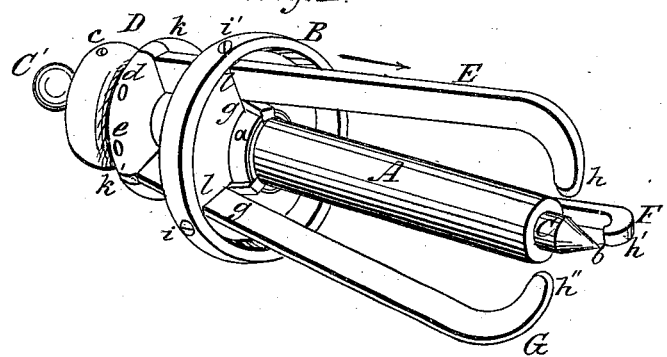
Figure 1 is a perspective view of the tool, showing all its parts in their proper connection.

I make the circle or disk B of malleable cast-iron, or any other suitable material, with a suitable hub or nave, as shown at $a$, on which I affix small springs, as indicated at $g$ $g$, fig. 1, and through which circle or disk I make mortises, as shown at $l$ $l$, in which the bars E F G work, all as indicated in fig 1.

I make the centre C of cast-steel, or any other suitable material, of practically a perfectly cylindrical form, as represented at C, fig. 1, and indicated in section in fig. 2, with a central or conical point, $b$, at one end, and a suitable knob at the other end, to receive a blow from a hammer, as shown at C and C', figs. 1 and 2.

I make the stationary part or frame of the tool of malleable cast-iron, or any other suitable material, substantially in the form shown at D, fig. 1, and indicated in section at D D, fig. 2, which, by means of a screw, shown at C, figs. 1 and 2, holds or supports the cylinder A in its proper longitudinal position, and the bars E, F, and G, are all connected, as hereinafter described.

I make the bars of cast-steel, or any other suitable material, substantially in the form or shape shown at E, F, and G, fig. 1, one of which bars is also shown at E, fig. 2.

I attach these bars, E, F, and G, to the frame D by means of joint-pins, as indicated at $d$ and $e$, fig. 1, and $d$, fig. 2, or by any other convenient joints, and to the hub or nave $a$, I secure or affix slight springs, as indicated at $g$ $g'$, to throw the bars outward, in the mortises, so as to carry their points $h$ $h'$ $h''$ away from the material, to release it; and to regulate the bars E, F, and G, so that their points $h$ $h'$ $h''$ may meet at the exact centre, I fit adjusting-screws in the periphery of the circle B, as indicated at $i$ $i'$, fig. 1, and in section in fig. 2, by which I can rectify any defect in the construction of the circle B, or the wearing of the points $h$ $h'$ $h''$, (the mortises in the circle or disk B being long enough for that operation.)

Having made the several parts, as before described, I pass the rear ends of the bars E, F, and G, through the mortises in the circle or disk B, and into the joint spaces in the front or main collar of the frame D, as shown at $k$ $k'$, fig. 1, and indicated at $k$, fig. 2, where I secure them in their positions by suitable joint-pins, as before described. I then pass the cylinder A through the frame D and the nave $a$, of the circle B, and secure it in the desired position by a binding-screw, as indicated at $c$, figs. 1 and 2. I then insert the solid centre, as indicated at C, figs. 1 and 2, when the tool will be ready for use.

To use this tool or centrer, I draw back the centre C until it is out of the way. I then pass the ends $h$ $h'$ $h''$ of the jaws over the article to be centred, until the cylinder A rests on the end of the article, when, by forcing the circle B forward, or in the direction indicated by the dart, the three jaws, E, F, and G, will equally approach the centre until their points, $h$ $h'$ $h''$, are stopped by the outer surface of the article to be centred, and then by forcing down the centre C, by a hammer or otherwise, the point $b$ will mark the exact centre of the article.

The advantages of my improvement consist in that it designates the exact centre of any article which is, in its cross-section, a circle, an equilateral triangle, a hexagon, or any other similar polygon; and any other number of jaws can be used, if found necessary, as any mechanic will readily understand.

What I claim as my invention, and desire to secure by Letters Patent, is—

The combination of the frame D, jaws E, F, and G, sliding circle or disk B, cylinder A, and centre C, when they are constructed and arranged substantially as herein described and set forth.

WILLISTON I. ALVORD.

Witnesses:
P. C. MOULTON,
R. FITZGERALD.